Jan. 29, 1963  A. F. BROOK  3,075,290
UNIVERSAL GAGE
Filed March 25, 1960  2 Sheets-Sheet 1
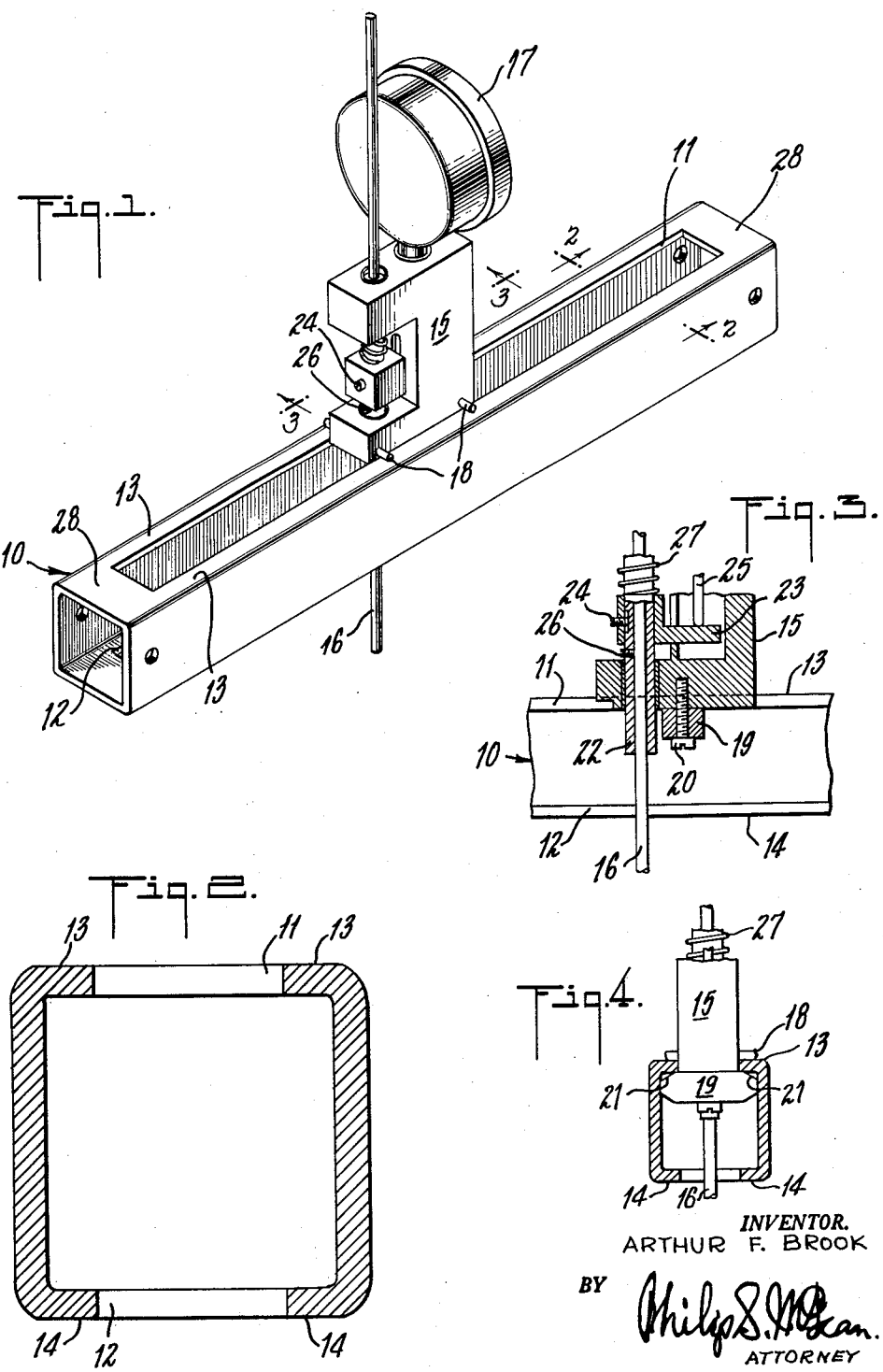
INVENTOR.
ARTHUR F. BROOK
BY
ATTORNEY Jan. 29, 1963  A. F. BROOK  3,075,290
UNIVERSAL GAGE
Filed March 25, 1960  2 Sheets-Sheet 2
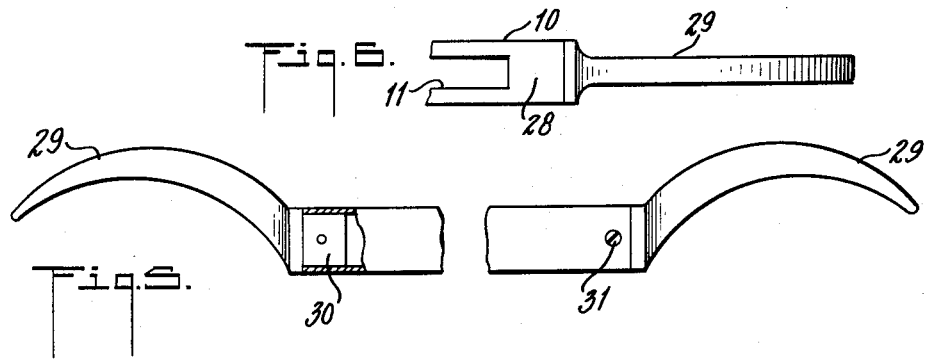
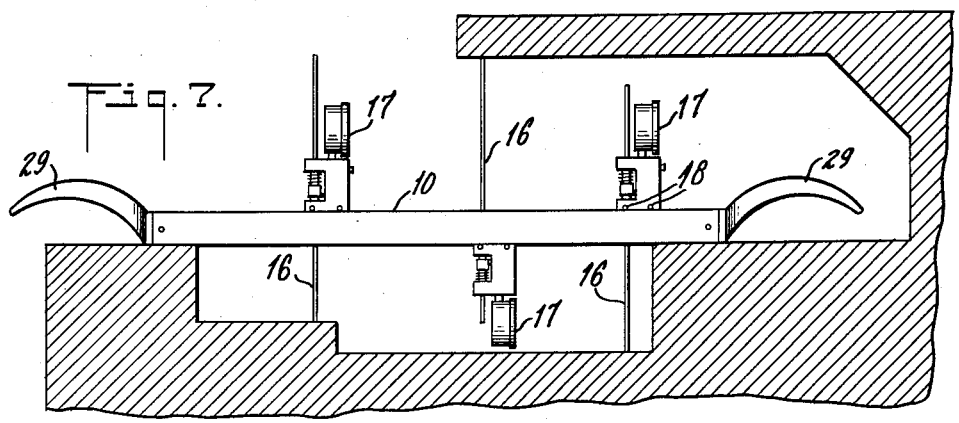
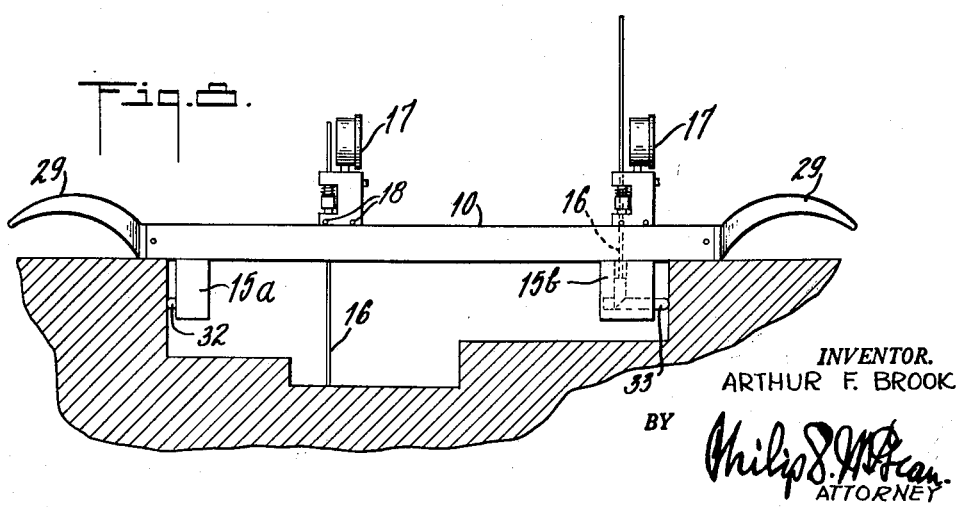
INVENTOR.
ARTHUR F. BROOK
BY
ATTORNEY

United States Patent Office 3,075,290
Patented Jan. 29, 1963

3,075,290
UNIVERSAL GAGE
Arthur F. Brook, 140 S. Hamilton St., Poughkeepsie, N.Y.
Filed Mar. 25, 1960, Ser. No. 17,589
1 Claim. (Cl. 33—169)

The invention disclosed in this patent is an instrument for gaging depth and other dimensions.

Objects of the invention are to provide a universal form of gage which may be used for all kinds of measurements, including, in addition to depth, dimensions or distances, such as for width, height, location of grooves, shoulders or other projections, inside and outside diameters, and the like.

Particularly it is a purpose of the invention to provide a gage of this character of simple construction, consisting of but few parts, rugged in design, suited to rough machine shop handling, rigid but light construction, made up of readily available materials and one which with all these advantages may be produced and sold at low cost.

Other desirable objects and the novel features of construction, combination and relation of parts through which objects of the invention are accomplished are set forth and will appear in the course of the following specification.

The drawings accompanying and forming part of this specification illustrate a present commercial embodiment of the invention. Structure however may be modified and changed as regards the immediate illustration, all within the true intent and scope of the invention as hereinafter defined and claimed.

FIG. 1 in the drawings is a perspective view of the gage as set up for depth measurement.

FIG. 2 is an enlarged cross sectional view of the rectangular cross section tubular gage bar as taken on a plane indicated by section line 2—2 of FIG. 1.

FIG. 3 is a broken vertical sectional view as on substantially the plane of line 3—3 of FIG. 1, showing operating connections from the feeler rod up to the spindle of the dial indicator or meter.

FIG. 4 is a broken cross sectional view of the clamp structure for securing the meter support in adjustable relation on the gage bar.

FIG. 5 is a broken side elevation of the tubular gage bar, sectioned at the left end to show the handle removably secured therein.

FIG. 6 is a broken top plan view of the right hand end of the gage bar with the handle secured thereto.

FIG. 7 is a broken sectional view of an illustrative work piece showing the gage set up and used for gaging different depths and overhead dimensions.

FIG. 8 is a similar view showing the gage set up for measuring depth and inside width of a piece.

In the general view, FIG. 1, the gage is shown as made up of a rectangular cross section tubular bar or beam 10, slotted longitudinally in the top and bottom at 11 and 12, providing at the edges of said slots the spaced parallel tracks 13 and 14 for receiving and supporting between them the block 15 carrying the gage pin 16 and the dial indicator or meter 17.

The parallel tracks 13—13 and 14—14 in the top and bottom of the gage bar are accurately machined to guide and locate the supporting block 15 entered between the same, as shown in FIGS. 3 and 4, and to support the block, as by means of the pins 18 projecting from the sides of the block and riding on these tracks.

With this construction the indicator block is accurately guided and supported and may be shifted to any position longitudinally of the bar, secured in any such longitudinally adjusted relation by a clamp, shown as a clamp bar 19, FIGS. 3 and 4, secured by screw 20 to the bottom of the block and having inclined edges 21 gripping the inside edges of the supporting tracks 13, 14.

Motion is transmitted from the gaging pin 16 to the meter in the illustration by a sleeve 22 guided up through the base of the block, FIG. 3, carrying a projecting lug 23 positioned for engagement by the operating spindle 25 of the metering instrument 17.

The feeler rod is shown as adjustably secured to the sleeve 22 by set screw 26 and a spring 27 is shown bearing on the lug 23 to normally hold the feeler in the lowered position indicated in FIG. 3.

The tubular gage bar with the spaced parallel tracks along the top and bottom of the same forms a rigid but light, accurate supporting structure with no excess in either weight or size. It thus may be handled with ease and used in places where space is limited.

The slots 11 and 12 in the opposite sides of the tubular bar preferably extend practically the full length of the bar but the ends of the bar are preferably left complete or uncut, providing bridge portions 28 solidifying the structure and serving also as stops limiting the longitudinal adjusting movement of the meter block.

It is contemplated also that in some instances where full length slots may not be needed these slots or possibly a slot in one side of the bar may be interrupted at the center or at one or more points to provide two or more contiguous slots instead of a single continuous slot.

The rectangular, square cross section of tube is preferred for compactness and other structural reasons, particularly for the strength and rigidity in such a form but it is contemplated that the tubular bar may have other than the rectangular cross section illustrated.

Another advantage of the form illustrated is that commercial "square" tubing may be used as the basic material for this invention, it generally being only necessary to slot and accurately finish top and bottom surfaces.

For convenience in placing and holding the gage, handles such as indicated at 29, in FIGS. 5 to 8, may be provided, these being shown as having projections 30 shaped to fit in the ends of the tubular bar where they may be removably secured by screws 31 entered through the sides of the bar.

FIG. 7 shows how meters 17 may be mounted on both the top and bottom of the gage bar and simultaneously used as for measuring both depth and overhead height.

FIG. 8 shows how a block 15a more or less similar to the meter block 15 may be secured in one end of the gage bar carrying a stop 32 engageable with one side wall for measuring width by plunger 33 supported in a block 15b secured at the opposite end of the bar and operating the gage meter at that end of the bar.

It will be apparent from these views that gage stops and meters may be set up in many other different relations on the tubular gage bar, as for gaging inside and outside diameters and other factors.

The hollow rectangular formation of the gage bar provides four corner angles of ample strength to provide desired rigidity for gage bars of extended length and this in a relatively light walled structure.

What is claimed is:

A gage comprising an open ended length of thin walled "square" tubing having parallel side walls and parallel top and bottom walls, said top and bottom walls having opposed longitudinally extending slots therein spaced inwardly from the side walls and thereby providing laterally extended opposed ledges projecting inwardly from the side walls along the opposite edges of the slots, supporting blocks fitting in sliding engagement in said slots and having laterally projecting portions riding on said ledges at the outside of said tubing, transversely extending adjustable clamps inside the tubing and engaging the inner sides of said laterally projecting ledges at opposite sides of the slots and thereby securing said blocks in variously supported position along the length of the slots, indicators mounted on said blocks and feeler rods operably connected with said indicators and extending through said slots in the tubing.

References Cited in the file of this patent
UNITED STATES PATENTS

| | | |
|---|---|---|
| 1,854,346 | Ostlind | Apr. 19, 1932 |
| 2,324,998 | Dague | July 20, 1943 |
| 2,560,177 | Kessler | July 10, 1951 |